April 23, 1968 F. E. NEILL 3,378,932
GRADE INDICATOR
Filed Nov. 4, 1966 2 Sheets-Sheet 1

INVENTOR.
FRANK E. NEILL
BY Willard S. Groen
ATTORNEY

April 23, 1968 F. E. NEILL 3,378,932
GRADE INDICATOR
Filed Nov. 4, 1966 2 Sheets-Sheet 2

INVENTOR.
FRANK E. NEILL
BY
Willard S. Groen
ATTORNEY

United States Patent Office 3,378,932
Patented Apr. 23, 1968

3,378,932
GRADE INDICATOR
Frank E. Neill, Phoenix, Ariz.
(5838 N. Palo Cristi Road, Paradise Valley, Ariz. 85251)
Filed Nov. 4, 1966, Ser. No. 592,101
4 Claims. (Cl. 33—215)

This invention pertains to grade indicators and is particularly directed to a grade indicator arranged for use with a motor vehicle.

One of the objects of this invention is to provide an instrument for mounting on a motor vehicle which give an indication of the steepness and whether one is going up or down hill while driving along a road.

Still another object is to provide a grade indicator of simple construction and dependable operation which may be mounted on a motor vehicle to give an indication of the steepness of grade one is traversing in the vehicle.

It is a further object to provide a grade indicator for a motor vehicle having an artificial horizon which is automatically referenced to a simulated road surface with vehicles thereon pointed in the direction of travel of the vehicle upon which it is mounted to give an immediate and easy-to-read grade indication while driving the vehicle.

Further features and advantages of this invention will appear from a detailed description of the drawings in which.

Figure 1:
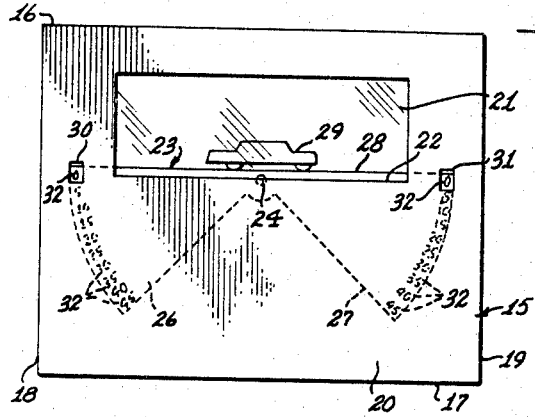
FIG. 1 is a front elevation of a visible grade indicator incorporating the features of this invention showing travel on a level road.
Figure 3:
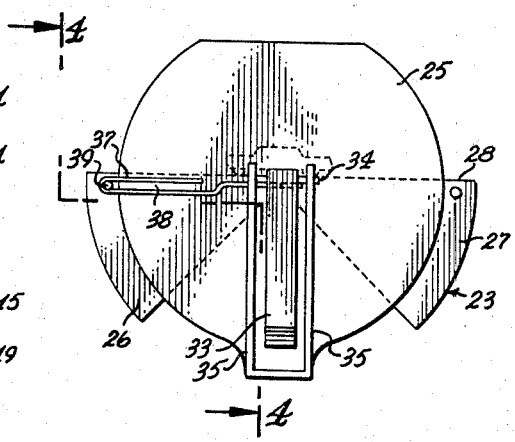
FIG. 3 is a rear elevation of the mechanism of the grade indicator shown in FIG. 1.
Figure 2:
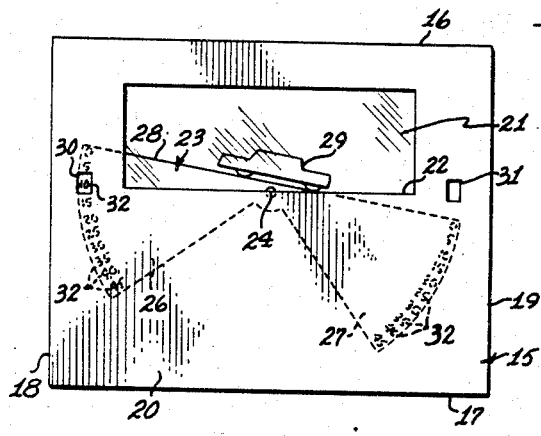
FIG. 2 is a front elevation as in FIG. 1 but showing travel on a downgrade.
Figure 5:
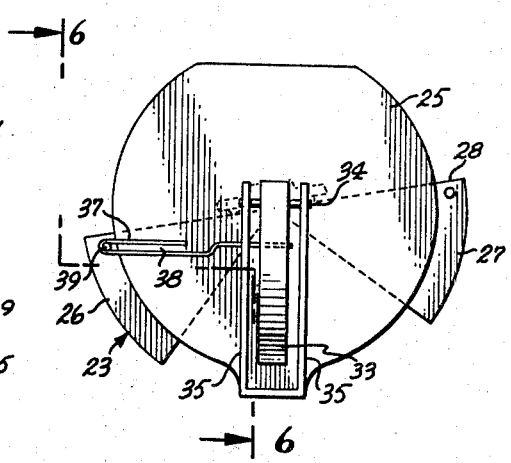
FIG. 5 is a view similar to FIG. 3 but showing the parts in their relative position when descending a hill.
Figure 4:
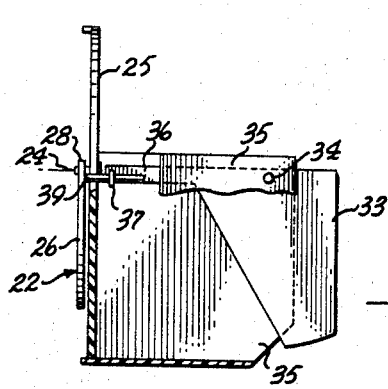
FIG. 4 is a sectional view on the line 4—4 of FIG. 3.
Figure 6:
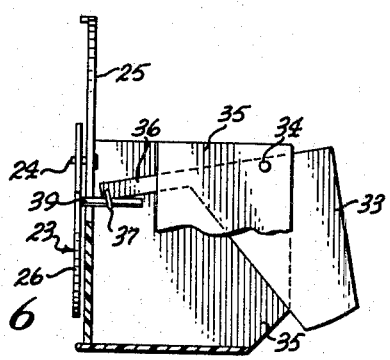
FIG. 6 is a sectional view on the line 6—6 of FIG. 5.

As an example of one embodiment of this invention there is shown a visible grade indicator comprising a housing indicated generally at 15 having a top 16, a bottom 17, and sides 18 and 19 to the front edges of which is fixed the front panel 20 having an indicating window 21, the bottom edge 22 of which forms an artificial horizon which remains substantially horizontal relative to the direction of travel of the vehicle upon which it is mounted, the front panel being mounted in a vertical transverse plane on the dashboard of the vehicle in observing position for the driver of the vehicle.

An indicating dial indicated generally at 23 is pivotally mounted on a suitable pin 24 carried in a support plate 25 secured to the housing 15 between the top 16 and bottom 17 thereof, the indicating dial 23 comprising diametrically oppositely disposed segments 26 and 27 for proper balance displayed immediately behind the window 21 in the front panel 20. A grade indicating line is formed by the top edge 28 of the dial 23 which swings relative to the artificial horizon bottom edge 22 of the window 21. The grade indicating line edge of the dial 23 normally remains substantially parallel to the road surface over which the vehicle is traveling and in order to aid in showing the direction of travel on this grade a simulated small model of a motor vehicle 29 is placed on the edge 28. It may also be desirable to provide a direct indication of the percent of grade or the angle of grade by use of small indicating openings 30 and 31 in the front panel 20 each side of the window 21 and appropriate indicial 32 on the dial 23 aligned with said openings 30–31.

The dial 23 is actuated by gravity in response to grade changes by means of a pendulum weight 33 mounted on a suitable pivot shaft 34 supported in the side plates 35 fixed to the support plate 25. An integral actuating arm 36 extending forwardly from the pendulum weight 33 has fixed to its outer end and extending laterally therefrom an actuator member 37 having a horizontally disposed slot 38 embracing an actuator pin 39 fixed in the dial 23 so that relative swinging of the pendulum 33 and the housing 15 effects swinging of the dial 23 about its axis 24 to give the indications described.

Figure 7:
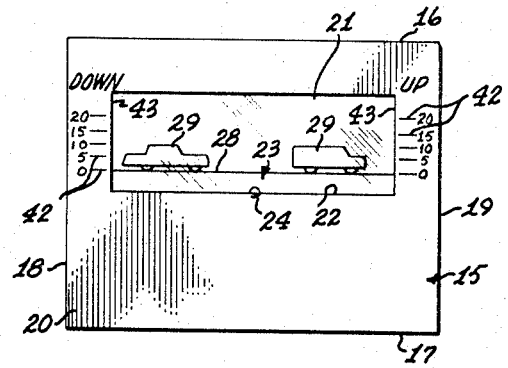
FIG. 7 is a front elevation of a modification of the grade indicator showing travel on a level road.
Figure 8:
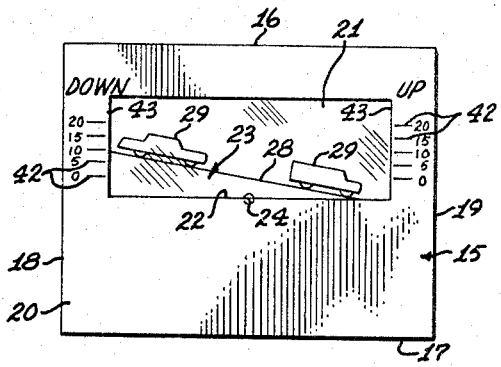
FIG. 8 is a view similar to FIG. 7 but showing travel on a downgrade.
Figure 10:
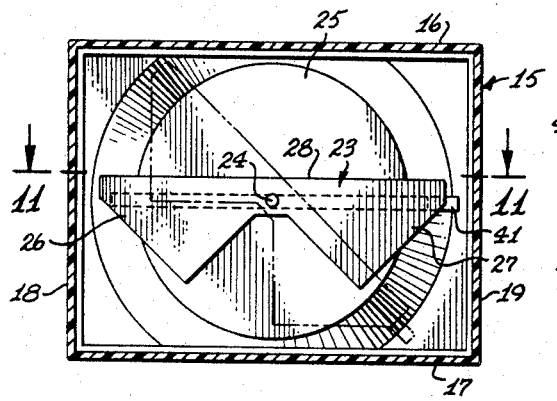
FIG. 10 is a sectional view on the line 10—10 of FIG. 11.
Figure 9:
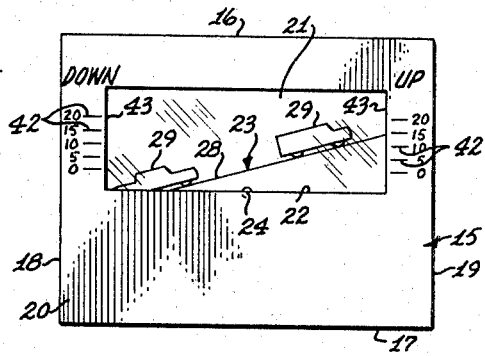
FIG. 9 is a view similar to FIG. 7 but showing travel on an upgrade.
Figure 11:
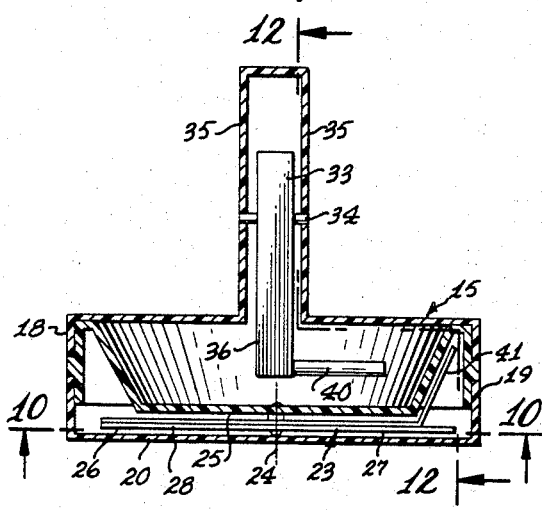
FIG. 11 is a sectional view on the line 11—11 of FIG. 10.
Figure 12:
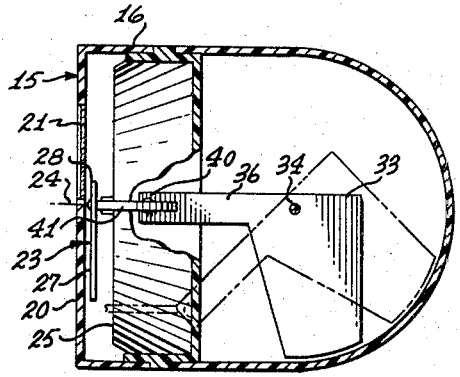
FIG. 12 is a sectional view on the line 12—12 of FIG. 10.

In the modification of FIGS. 7 through FIG. 12 the integral arm 36 is provided with a magnet 40 which is associated with a magnetically responsive arm 41 fixed to the dial 23 which follows the movements of the magnet 40 as the pendulum relatively swings in the housing 15 to provide the various movements shown in FIGS. 7, 8 and 9. In this arrangement the grade indicating edge 28 is directly referenced to graduations of percent of grade or angle of grade 42 adjacent the sides 43 of the window 21.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendant claims are intended to be included herein.

Having thus fully set forth and described this invention what is claimed and desired to be obtained by United States Letters Patent is:

1. A visible grade indicator for motor vehicles comprising in combination:
    (A) a housing arranged to be fixed to a motor vehicle,
    (B) a transversely disposed front panel on said housing having an indicating window with a bottom edge defining an artificial horizon,
    (C) a swinging indicating dial pivotally mounted on said housing having a grade indicating line edge and a simulated vehicle mounted on said grade indicating line arranged to tilt relative to said artificial horizon,
    (D) said dial carrying plural indicia for indicating the inclination of said housing,
    (E) and actuating means mounted in said housing responsive to the force of gravity to pivotally position said dial in response to the grade being traversed by said vehicle,
    said actuating means positioning said dial so that said grade indicating line edge appears in said indicating window inclined relative to the bottom edge of said window an amount corresponding to the inclination of said housing to the horizontal and the particular indicia corresponding to said inclination appears in said aperture.

2. In a visible grade indicator as set forth in claim 1 wherein there are two apertures, one on each side of said window, and wherein said dial carries two sets of indicia, one set corresponding to percent grade and the other to angle of inclination, one of said sets of indicia being registrable with one aperture and the other set being registrable with the other aperture.

3. In a visible grade indicator as set forth in claim 1 wherein said actuating means includes a pendulum pivotally mounted on said housing to swing about a horizontal transverse axis at right angles to the axis of swinging of said dial and mechanical actuating members interconnecting said pendulum and said dial for the simultaneous movement of said pendulum and dial in response to variations of the grade of the road surface over which the vehicle is traveling.

4. In a visible grade indicator as set forth in claim 1 wherein said actuating means includes a magnet and a magnetically responsive element interconnected between said dial and said pendulum whereby the variation in the relative position of said pendulum and said housing in response to changes of grade traversed said vehicle are transferred to said dial by magnetic force.

References Cited

UNITED STATES PATENTS

| | | | |
|---|---|---|---|
| 729,521 | 6/1903 | Allard | 33—215.1 |
| 1,312,303 | 8/1919 | Berry | 33—215.3 |
| 1,360,102 | 11/1920 | Ericson | 33—215.3 |
| 1,370,233 | 3/1921 | Spier | 33—215.1 |
| 1,533,723 | 4/1925 | Brown | 33—215.3 |
| 2,423,269 | 6/1947 | Summers | 33—204.2 |

FOREIGN PATENTS 1,251  5/1865  England.

LEONARD FORMAN, *Primary Examiner.*

L. ANDERSON, *Assistant Examiner.*